(12) United States Patent
Pirkola et al.

(10) Patent No.: US 6,965,783 B2
(45) Date of Patent: Nov. 15, 2005

(54) HANDHELD DEVICES

(75) Inventors: Jani Pirkola, Linkoping (SE); Timo Kinnunen, Paavola (FI); Lauri Salomaki, Rovaniemi (FI); Tea Liukkonen-Olmiala, Jaali (FI); Tiina Hynninen, Oulu (FI); Leena Sippola, Oulu (FI); Risto Lustila, Rovaniemi (FI); Sanna Kaartinen, Helsinki (FI)

(73) Assignee: Nokia Mobile Phones, Ltd., Espoo (FI)

( * ) Notice: Subject to any disclaimer, the term of this patent is extended or adjusted under 35 U.S.C. 154(b) by 535 days.

(21) Appl. No.: 09/745,579

(22) Filed: Dec. 21, 2000

(65) Prior Publication Data

US 2001/0041599 A1 Nov. 15, 2001

(30) Foreign Application Priority Data

Dec. 22, 1999 (GB) .............................. 9930365

(51) Int. Cl.⁷ .............................................. H04M 1/00
(52) U.S. Cl. ................ 455/550.1; 455/90.3; 455/556.1; 455/566; 455/575.1; 379/428.03; 379/433.01; 379/433.04
(58) Field of Search ............................. 455/90.1–90.3, 455/550.1, 556.1, 566, 579.1, 550, 575, 90, 556; 379/428.03, 433.01, 433.04

(56) References Cited

U.S. PATENT DOCUMENTS

| | | | |
|---|---|---|---|
| 4,987,411 A | 1/1991 | Ishigami | 340/709 |
| 5,339,388 A * | 8/1994 | Bates et al. | 345/742 |
| 5,598,183 A * | 1/1997 | Robertson et al. | 345/856 |
| 5,642,131 A | 6/1997 | Medellin et al. | 345/145 |
| 5,719,936 A * | 2/1998 | Hillenmayer | 379/447 |
| 5,748,512 A | 5/1998 | Vargas | 364/709.12 |
| 5,805,159 A * | 9/1998 | Bertram et al. | 345/764 |
| 5,825,353 A | 10/1998 | Will | 345/184 |
| 6,005,573 A * | 12/1999 | Beyda et al. | 345/784 |
| 6,349,220 B1 * | 2/2002 | Prior et al. | 455/566 |
| 6,415,138 B2 * | 7/2002 | Sirola et al. | 455/90 |
| 6,433,801 B1 * | 8/2002 | Moon et al. | 345/840 |
| 6,473,069 B1 * | 10/2002 | Gerpheide | 345/157 |
| 6,526,296 B1 * | 2/2003 | Nieminen | 455/575 |

FOREIGN PATENT DOCUMENTS

| | | | | |
|---|---|---|---|---|
| EP | 0 588 210 A | 3/1994 | | |
| EP | 0 913 977 A | 5/1999 | | |
| GB | 2299302 | 10/1996 | | |
| GB | 2330981 | 5/1999 | | |
| GB | 2330982 | 5/1999 | | |
| GB | 2344905 | 6/2000 | | |
| JP | 403048922 | * | 3/1991 | G06F/3/33 |

* cited by examiner

Primary Examiner—William Trost
Assistant Examiner—Stephen M. D'Agosta
(74) Attorney, Agent, or Firm—Perman & Green, LLP

(57) ABSTRACT

A hand held communication device having a display, the display having a plurality of different regions, at least one function being selectable via at least one region and a touch sensitive region, the touch sensitive area being arranged so that movement with respect to the touch sensitive area region causes an indicator to move across said display wherein the indicator is arranged to move only from one region to another.

21 Claims, 5 Drawing Sheets

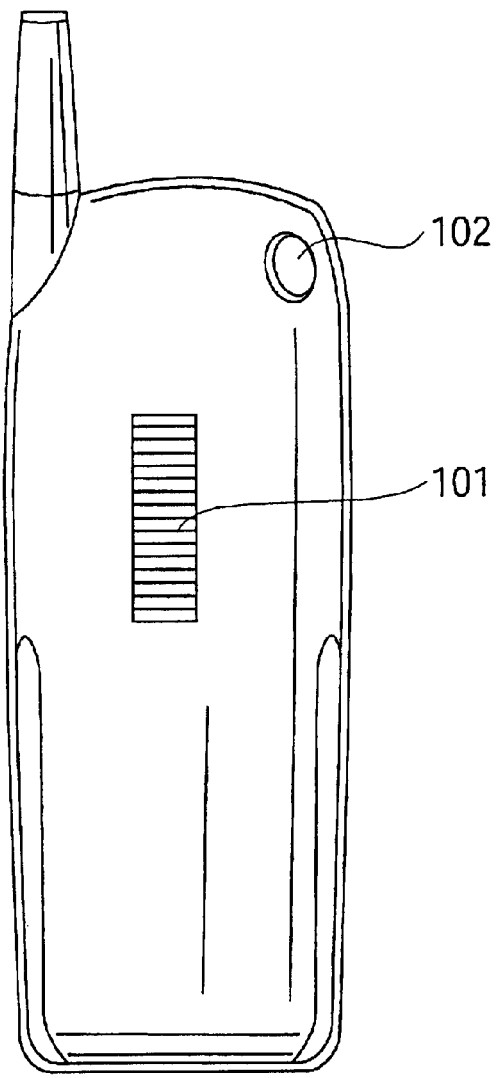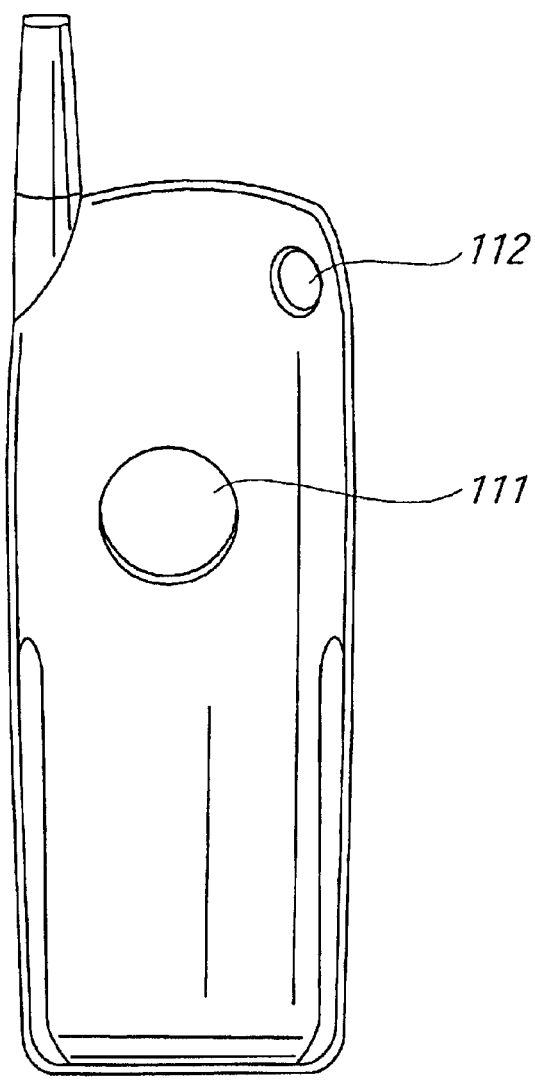
FIG. 6
FIG. 7

HANDHELD DEVICES

FIELD OF THE INVENTION

The present invention relates to handheld devices and in particular, but not exclusively, to handheld devices such as mobile telephones or the like.

BACKGROUND OF THE INVENTION

Wireless cellular telecommunication networks are known. The area covered by a telecommunications network is divided up into a number of cells. Each cell has a base transceiver station associated with it. The base transceiver is arranged to send signals to and receive signals from mobile stations in the same cell as the respective base station. The signals sent between the mobile station and the base station permit voice and/or data communications to take place.

Mobile stations are generally provided with a user interface which permit the user to interact with the mobile station. To facilitate the interaction with the user, a display is provided. Usually, the interface comprises a number of keys which can be operated by the user. These keys typically include numeric keys to allow a user to input a telephone number and cursor keys which interact with the display. Mobile telephones often use a menu system where a cursor is moved between various options and a option is selected when the cursor is over that option and a select key is activated.

In GB-A-2330981, a radio telephone handset is shown. The radio telephone handset has a housing with a front face which is used by the user when making a call. The telephone has a user interface which includes a touch input means on a different surface of the housing for controlling the processing of voice signals which are supplied to an audio interface. One touch interface described is a touch pad. As the user moves his finger across the touch pad, a cursor is moved across the display.

However, the problem with such a system is that it is difficult to control. The size of the touch pad is generally limited by the size of the mobile telephone. If the size of the telephone is not to be increased, the touch pad will have a relatively small dimension. It can be difficult for the user to accurately move the cursor using the touch pad to the required position. This is particularly the case where a number of different options are provided on the display.

SUMMARY OF THE INVENTION

It is therefore an aim of embodiments of the present invention to address this problem.

According to a first aspect of the present invention, there is provided a hand held communication device comprising a display, said display in use have a plurality of different regions, at least one function being selectable via at least one region; and a touch sensitive region, said touch sensitive area being arranged so that movement with respect to the touch sensitive area region causes an indicator to move across said display, wherein said indicator is arranged to move only from one region to another.

According to a second aspect of the present invention, there is provided a method of controlling a hand held communication device comprising the steps of operating a touch sensitive region so as to cause an indicator to move across a display of the communication device; controlling the indicator to move only from one region to another across the display; and selecting a function associated the region where the indicator is located when said selection step is performed.

BRIEF DESCRIPTION OF THE DRAWINGS

For a better understanding of the present invention and as to how the same may be carried into effect, reference will now be made, by way of example, to the accompanying drawings in which:

FIG. 6 shows a first alternative embodiment of a mobile telephone; and

FIG. 7 shows a second alternative embodiment of a mobile telephone.

DETAILED DESCRIPTION OF EMBODIMENTS OF THE INVENTION

Figure 1:
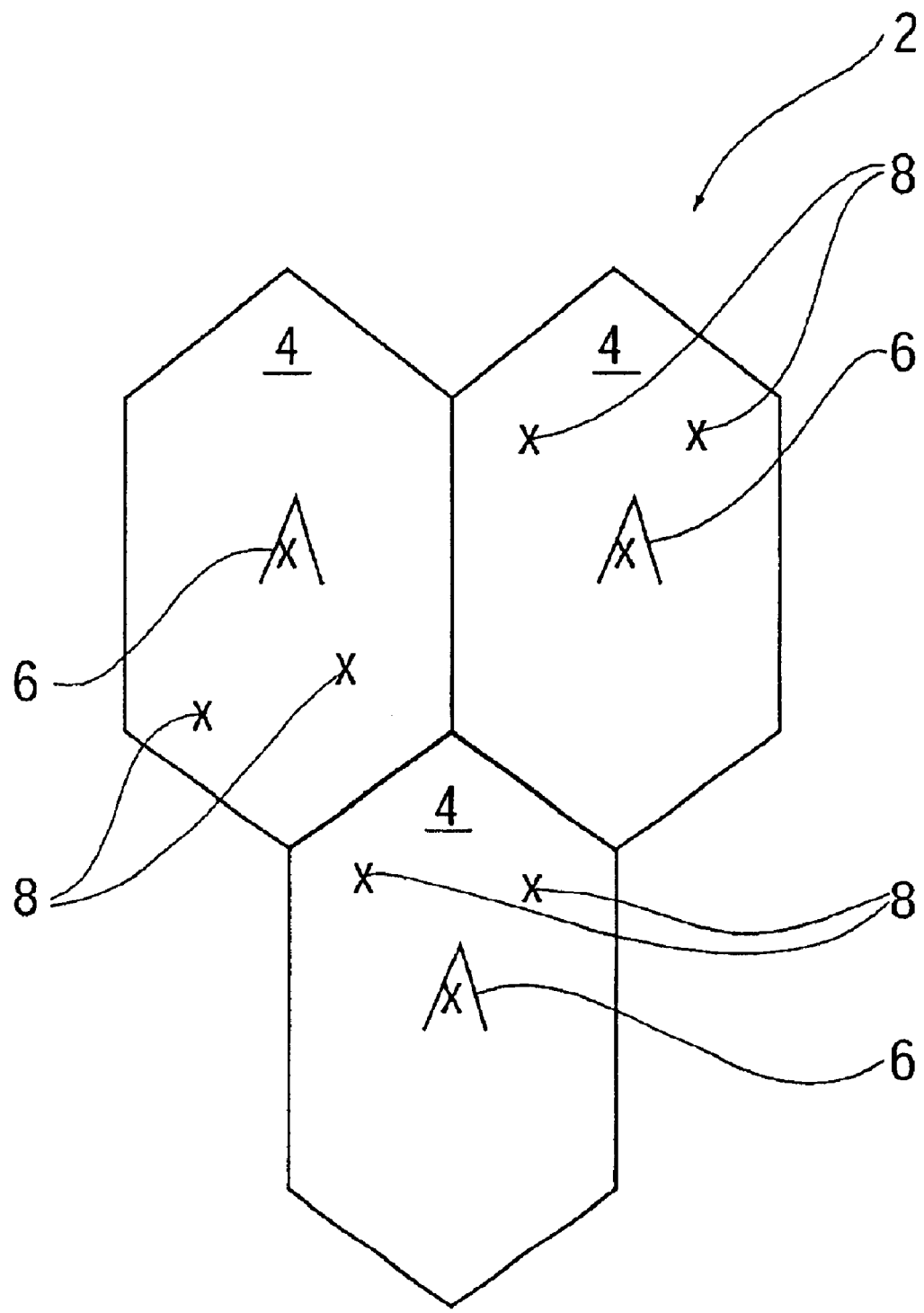
FIG. 1 shows a cellular telecommunications network with which embodiments of the present invention can be used.

Reference will first be made to FIG. 1 which shows a wireless cellular telecommunications network 2. The area covered by the network 2 is divided into a plurality of cells 4. Each of the cells 4 has associated with it a base transceiver station 6. Each base transceiver station 6 is arranged to communicate with mobile stations 8 in the cell associated with that base transceiver station 6.

The network shown in FIG. 1 may use any suitable method of communication for communicating with the mobile stations. In particular, one or more of the following methods may be used: Time Division Multiple Access, Frequency Division Multiple Access, Spread Spectrum Methods such as Code Division Multiple Access or other suitable methods. In some embodiments of the present invention, hybrids of two or more of these access methods may be used.

Figure 3:
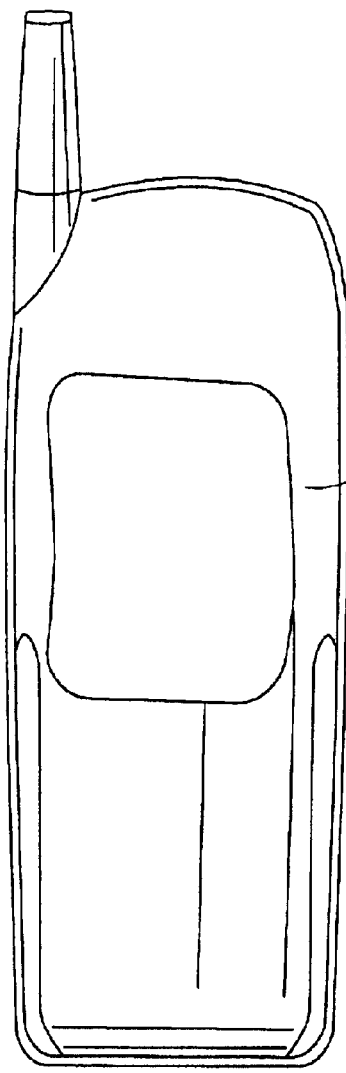
FIG. 3 shows a view from behind of the mobile telephone of FIG. 2.
Figure 2:
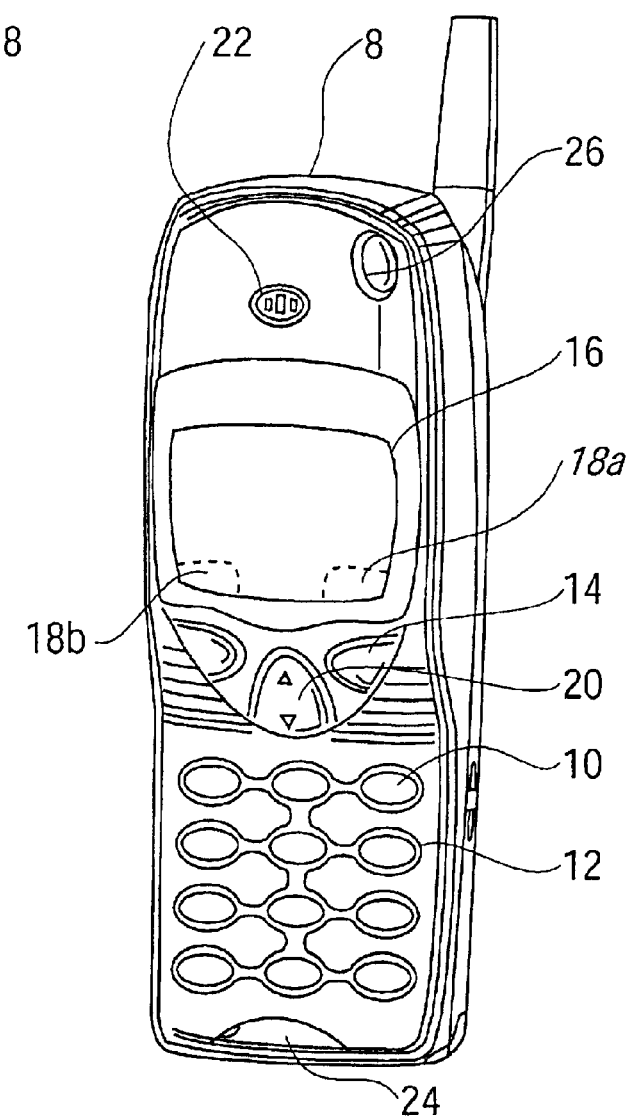
FIG. 2 shows a front view of a mobile telephone embodying the present invention.

Reference will be made to FIG. 2 and FIG. 3 which show a mobile telephone embodying the present invention.

As can be seen from FIG. 2, the mobile telephone has a user interface which comprises a key pad 10. The key pad 10 has a first group 12 of keys in the form of alpha numeric keys by which the user can enter a telephone number, write a text message (SMS), write a name, for example associated with the telephone number, or any other alpha numeric data entry which is required. These first groups of keys are used for entering data into the telephone.

The keyboard also has a second group of keys 14 which are generally referred to as operation keys. The keys 14 operate in dependence on the state of the telephone. These keys generally allow the function of the phone to be controlled in conjunction with the display 16. The display 16 may include one option 18a in the right hand lower corner of the display and a second option 18b on the left hand bottom corner of the display. One or other of these options may be selected by activating the key 14 under that particular option. The keys 14 also include a scroll key 20 which controls a cursor on the display. The cursor can be moved up and down a list of options displayed on the display 16.

The mobile telephone also comprises an ear piece 22 which permits the user to receive audio signals, for example in the context of a telephone call. The mobile telephone also has a microphone 24 which is arranged to pick up sounds, such as speech, made by the user so that a call can be conducted. The mobile telephone also has an on off button 26 for switching the mobile telephone on or off.

Reference is made to FIG. 3 which shows the exterior of the mobile telephone. The back of the mobile telephone has a touch pad 28. Touch pads are well known to those skilled in the art and will not be described in any detail here. However, touch pads generally comprise a surface underneath which are arranged a plurality of sensors. The surface can be smooth or may incorporate bumps or the like. The position of the finger of the user on the touch pad 28 can be detected by any suitable technique. For example, the pressure applied by the users finger causes the position of the finger on the touch pad to be identified. The pressure applied by the finger can be detected by pressure sensors below the touch pad surface. It should be appreciated that touch pads which use techniques other than pressure in order to detect the position of the finger are known and can be used in alternative embodiments of the present invention.

The touch pad 28 is, in preferred embodiments of the present invention, relatively large and may take up, for example, around a third of the back of the mobile telephone 8. It is of course possible for the touch screen to be bigger or smaller than this. The touch screen is preferably provided in the upper region of the back of the mobile station. This is so that when the user holds the mobile telephone in his hand, with the display facing him, the user's finger, usually the fore finger, is able to move around all of the touch pad, as required whilst the rest of the hand is able to hold the mobile telephone. The position of the touch pad on the back of the mobile telephone is such that it is easy for the user to know where to move his finger, despite the fact that the user cannot see his finger.

In one embodiment of the present invention, there is a correlation between the positions on the touch pad and positions on the display. Accordingly, different positions of the touch pad correspond to different positions on the display. For example, the top left hand corner of the touch pad corresponds to the top left hand corner of the display and so on.

In alternative embodiments of the invention, there is not the same correlation. Rather, a cursor is moved around the display 16 in accordance with movements made by the user across the touch pad 28. Accordingly, if the user moves his finger to the right, the cursor will move on the screen from its current position to the right. Likewise, if the user moves his finger to the left, the cursor will be moved from its current position to the left. The same is true for movements of the finger up and down the touch pad 28. This latter arrangement is preferred in some embodiments of the invention in that the a relatively large distance can be moved by the users finger on the touch pad for a relatively small distance on the display. However the first described option may be preferred in alternative embodiments of the invention.

Figure 5A:
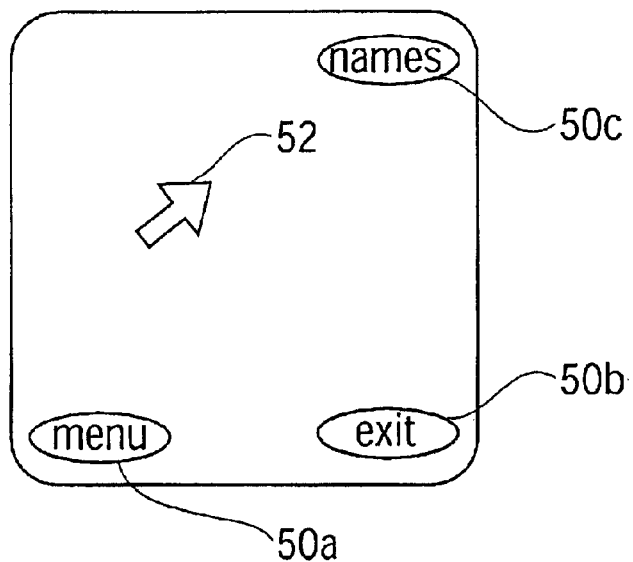
FIG. 5 shows examples of a display of a mobile telephone embodying the present invention.

Reference is made to FIG. 5 which shows three examples of information displayed on the display 16. Referring first to FIG. 5*a*, the screen has three operative areas 50*a*–*c*. The user can use the operation keys 14 in order to select one of these three areas in one mode of operation. However, the user is also able to use the touch pad in order to select the functions associated with one of these areas.

Consider the case where the cursor 52 is in the middle of the screen. When the user moves the cursor upwardly, the cursor will automatically be moved to the names part of the screen 50*c*. If the cursor is moved down to the left, the cursor will be moved automatically to the menu part 50*a* of the display. If the cursor is moved down to the left of the display, the cursor is automatically placed over the exit part 50*b* of the display. In other words, in preferred embodiments of the present invention, the cursor is moved automatically to one of the three active areas 50*a* to 50*c*. The cursor does not have to be moved by the user so as it is exactly positioned over the respective active areas on the display. Rather the cursor will automatically be positioned over the nearest active area. The direction of movement of the user's finger across the display can also be taken into account when determining the active area over which the cursor is to be located.

The preferred embodiments of the present invention permit the cursor only to be located over an active area. The location of the cursor, the amount by which the user moves his finger across the touch pad and/or the direction of the movement are used in preferred embodiments of the present invention in order to determine the active area over which the cursor is to be located.

In the embodiment shown in FIG. 5*a*, the cursor is initially shown as being in a position other than on an active area of the display. In alternative embodiments of the present invention, the cursor may be permitted only to be over the active areas of the display. Accordingly, the cursor may initially be over one of the three active areas shown in FIG. 5*a*. The users finger permits the cursor only to move from one active area to the other and not to any intermediate positions. This makes the touch pad easier for the user to use in that the user does not need to precisely ensure that the cursor is over the active area but only to move the cursor in the general direction of an active area.

In order to select an active area, this can be done by activating a separate key on the front or back of the mobile telephone. However, in preferred embodiments of the present invention, an active area can be selected by the user tapping the touch pad at the location which ensures that the cursor is over the required active area one or more times. In preferred embodiments of the present invention, the user taps the area of the touch pad twice.

Figure 5B:
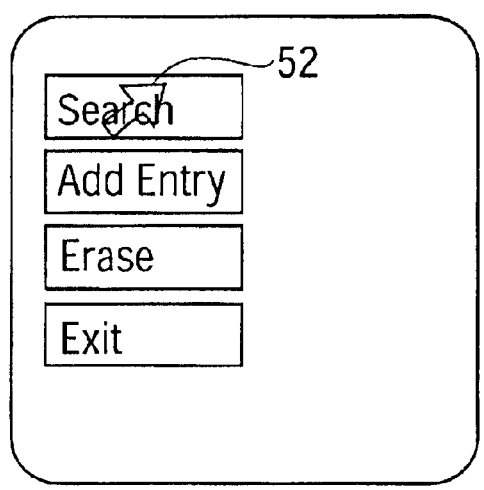

If, for example, the names area 50*c* of the display is selected, then the display 16 may be as shown in FIG. 5*b*.

As can be seen in FIG. 5*b*, four options are available to the user. These options are in a list form. Once again, the cursor 52 is permitted only to be associated with one of the four entries. Movement of the users finger on the touch pad causes the cursor to move up or down the list or to remain on the current entry. For example, once the cursor is over a particular option, movement of the users finger leftwardly or rightwardly does not cause the cursor to move. However, movement of the users finger up or down the touch pad will cause the cursor to move up and down the list respectively.

It should be appreciated that the same method as described in relation to FIG. 5*a* can be used to select one of the options displayed in FIG. 5*b*.

Figure 5C:
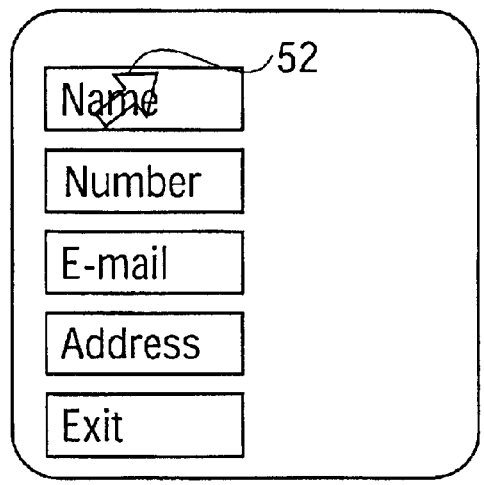

FIG. 5*c* illustrates the options which are displayed when the user selects the add entry option of FIG. 5*b*. The selection of the add entry option of FIG. 5*b* causes five options to be displayed on the display, again in a list. The various options shown in FIG. 5*c* are selected in exactly the same way as described in relation to FIG. 5*b*.

Figure 4:
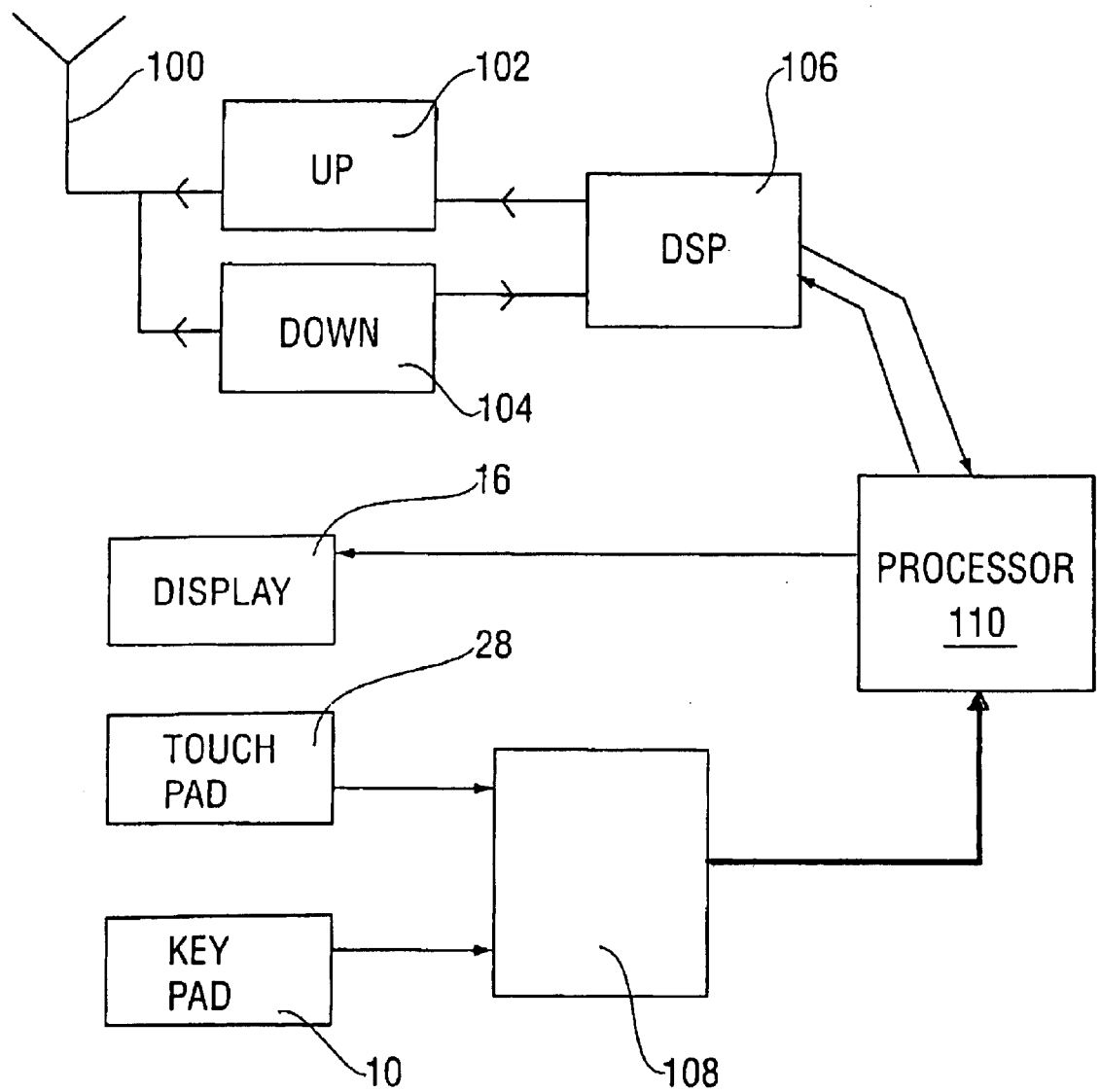
FIG. 4 shows a block diagram of various components in a mobile telephone embodying the present invention.

Reference will now be made to FIG. 4 which shows the block diagram of a mobile telephone embodying the present invention. The mobile telephone has an antenna 100 which is used to transmit signals to the base station. Signals to be transmitted by the antenna 100 are unconverted by an up converting arrangement 102. The up converting arrangement 102 converts signals from a digital signal processor 106 from the base band to the frequency with which the signals are to be transmitted.

The signals which are received by the antenna 100 are input to a down converting arrangement 104 which converts the signals received to the base band frequency. The signals are output by the down converting arrangement 104 to the digital signal processor 106. The digital signal processor 106 is arranged to process the received signals and to put the signals to be transmitted into the suitable format.

The touch pad 28 and the key pad 10 provide output signals which are the result of the user interacting with the touch pad and key pad 28 and 10 respectively. A unit 108 receives the signals from the touch pad and key pads respectively and translates the signals into a form which can be used by a processor 110. The processor 110 controls the display 16 and, in particular, what is displayed on that display 16. The processor 110 uses the information received from the key pad and touch pad to control what is displayed on the display 16. Information input via the touch and key pads are also used by the processor 110 to control the digital signal processor 106. The processor 110 also receives information from the digital signal processor 106 which can also control what is displayed by the display 16.

It should be appreciated that in alternative embodiments of the present invention, the touch pad may be omitted and instead the display itself may be touch sensitive. The touch sensitive display may operate in a similar way to the touch pad so that the cursor is moved from one active part of the display to another. In alternative embodiments of the present invention, the touch screen may be replaced by a finger wheel 101 (see FIG. 6) which can provide scrolling move in two directions about a single axis or a roller ball III (see FIG. 7) which provides scrolling action along further axes. Manipulation of the display is achieved under processor control in accordance with control signals corresponding to the direction and speed of rotation of the rolling means. The active part of the display can be selected either by pressing on the rolling means or by pressing a separate key 102 or 112 in the respective embodiments shown in FIGS. 6 and 7.

In the embodiments of the invention described, options can be selected using the touch pad or the operational keys 14. In some embodiments of the present invention, the operational keys 14 may be omitted and the touch pad only provided. In a further alternative embodiment of the invention, the operational keys may provide a different function when the touch pad is used.

In the embodiment of the invention described, the touch pad controls the position of a cursor. The cursor may be an arrow or a bar. It should be appreciated that any other pointing device can be used in alternative embodiments of the invention. Alternatively, any other suitable method can be used to highlight a selected area. Any suitable indicator can be used in alternative embodiments of the invention.

In alternative embodiments of the invention, a tool may be used with the touch pad in order to control the movement of the cursor across the screen.

Embodiments of the invention can be used to control any function of the mobile telephone.

Preferred embodiments of the present invention have been described in the context of a mobile telephone. However, embodiments of the present invention may be applied to any other communication device or mobile terminal.

What is claimed is:

1. A hand held communication device comprising:
   a display, said display in use have a plurality of different active regions, at least one function being selectable via each active region; and
   a touch sensitive region, said touch sensitive region being arranged so that movement with respect to the touch sensitive region causes an indicator to move across said display, wherein said touch sensitive region is arranged on a first side of said device and said display is arranged on a second side, and wherein said first and second sides are opposite one another; and
   wherein said indicator is arranged to move only from one active region to another.

2. A device as claimed in claim 1, wherein said touch sensitive region is arranged to detect movement of a users finger across the touch sensitive region.

3. A device as claimed in claim 1, wherein said touch sensitive region is arranged to detect movement of a tool across the touch sensitive region.

4. A device as claimed in claim 1, wherein said touch sensitive region comprises a surface.

5. A device as claimed in claim 1, wherein said touch sensitive region is a touch pad.

6. A device as claimed in claim 1, wherein said touch sensitive region comprises a rolling means.

7. A device as claimed in claim 6, wherein said rolling means is arranged to move said indicator in two directions about a single axis.

8. A device as claimed in claim 6, wherein said rolling means is arranged to move said indicator in a plane containing two perpendicular axis.

9. A device as claimed in claim 1, wherein said touch sensitive region is provided in conjunction with said display to provide a touch sensitive display.

10. A device as claimed in claim 1, wherein said indicator is a cursor.

11. A device as claimed in claim 1, wherein said device is a mobile telephone.

12. The device of claim 1 wherein a movement of the indicator in a direction of one of the active regions causes the indicator to automatically position itself within that active region.

13. The device of claim 12 wherein the indicator can only be moved in the direction of one of the active regions.

14. The device of claim 1 wherein the indicator is initially displayed over one of the active regions of the display and can only be moved to another active region of the display.

15. The device of claim 14 wherein a movement of the indicator in a direction of one of the other active regions causes the indicator to automatically be positioned within that active region so that the at least one function is selectable.

16. The device of claim 1 wherein the display is adapted to only associate the indicator with one of the active regions on the display and not any position on the display therebetween.

17. A method of controlling a hand held communication device comprising a display in use having a plurality of different active regions, the method comprising the steps of:
   operating a touch sensitive region on a first side of the device so as to cause an indicator to move across the display on a second side of the communication device that is opposite the first side;
   controlling the indicator to move only from one active region to another across the display; and
   selecting a function associated with the active region where the indicator is located when said selection step is performed.

18. The method of claim 17 wherein the step of controlling further comprises moving the indicator in a direction of one active region on the display and wherein the indicator is automatically moved to the active region.

19. The method of claim 17 wherein operating the touch sensitive region of the display causes the indicator to move only to active regions of the display and not any positions between active regions of the display.

20. The method of claim 17 wherein operating the touch sensitive region of the display only allows the indicator to be moved in a direction of another active region of the display and not in any other direction.

21. A method of controlling and held communication device comprising display in use having a plurality of different active regions, the method comprising the steps of:

operating a touch sensitive region so as to cause an indicator to move across the display of the communication device;

controlling the indicator to move only from one active region to another across the display, wherein the indicator will not automatically reposition itself from one active region of the display if the indicator is moved in a direction not associated with one of the active regions of the display; and selecting a function associated with the active region where the indicator is located when said selection is performed.

\* \* \* \* \*